May 5, 1942. R. C. ANGELL 2,282,110
FLUID DISPENSER
Filed Jan. 17, 1941
FIG. 1.
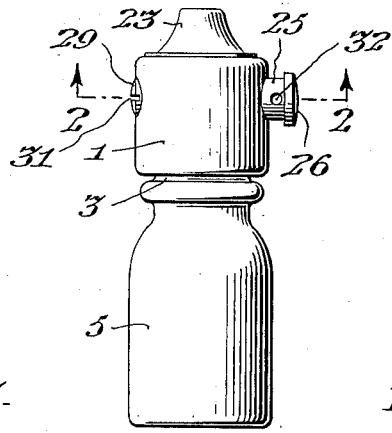
FIG. 3. FIG. 4.
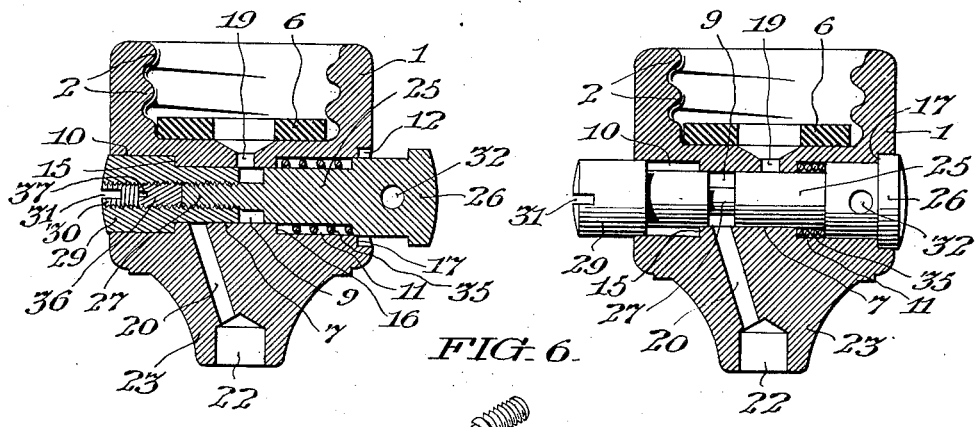
FIG. 5. FIG. 2. FIG. 7.
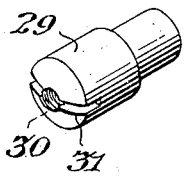
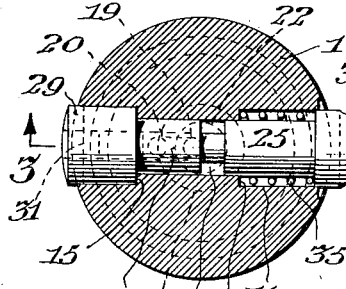
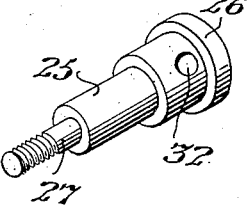
FIG. 8.
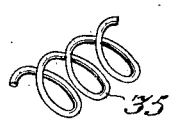
Inventor
Robert C. Angell,
By Clifton C. Hallowell
Attorney Patented May 5, 1942

2,282,110

UNITED STATES PATENT OFFICE 2,282,110

FLUID DISPENSER

Robert C. Angell, Prince Bay, N. Y., assignor to The S. S. White Dental Manufacturing Company, a corporation of Pennsylvania Application January 17, 1941, Serial No. 374,856

3 Claims. (Cl. 221—105)

My invention relates particularly to that class of fluid dispensers that are adapted to dispense a predetermined charge of fluid such as mercury from a container to which it may be connected, and is especially directed to valve mechanism whereby the amount of said charge of mercury may be varied to a carefully predetermined degree.

The principal objects of my invention are to provide a dispensing device in the form of a closure cap for a container which may be in the form of a bottle affording a reservoir for containing fluid such as mercury and from which the mercury may be introduced into said dispenser to be measured thereby and discharged therefrom in an accurately predetermined volume while the remaining contents of said container is held in check.

Other objects of my invention are to provide a fluid container closure cap having a passageway extending therethrough for the convenient discharge of the fluid in said container, and having a discharge controlling valve provided with a chamber arranged to measure and discharge predetermined volumes of said fluid, and having means whereby the area of said chamber may be conveniently varied.

Further objects of my invention are to provide a fluid dispensing device with a controlling valve comprising relatively adjustable members forming a chamber for measuring and dispensing fluid, and including an independently adjustable abutment serving as a stop for limiting the relative approaching movement of said relatively adjustable valve members.

My invention includes a fluid dispenser having non-alined inlet and outlet passageways, and having a transversely disposed reciprocatory valve provided with a fluid measuring chamber arranged to alternately register with said inlet and outlet passageways.

The form of my invention as hereinafter described comprises a closure cap for a bottle or container to which it may preferably be engaged in screw-threaded relation with an interposed annular leak-proof washer, said cap being provided with a transverse bore in communication with relatively unalined inlet and outlet passageways which may alternately connect with a suitably provided chamber in a reciprocatory valve plug slidably disposed in said bore. Said valve plug is arranged to be normally spring pressed into position wherein its chamber communicates with the inlet passageway to receive fluid from said container, but may be manually shifted to communicate with the outlet passageway to discharge said fluid therethrough.

My invention also includes all of the various novel features of construction and arrangement of the cooperative parts as hereinafter more specifically set forth.

In the accompanying drawing, Figure 1 is a front elevational view of the fluid dispensing closure cap shown attached to a fluid containing bottle disposed in its normal or upright inoperative position; Fig. 2 is an enlarged inverted plan sectional view of the fluid dispensing cap as shown in Fig. 1, taken on the line 2—2 in Fig. 1, the valve parts being shown in elevation for convenience of illustration; Fig. 3 is an enlarged transverse vertical sectional view, in inverted position, of the dispensing cap shown in Figs. 1 and 2, taken axially on the line 3—3 in Fig. 2; Fig. 4 is an enlarged transverse vertical sectional view similar to Fig. 3, but showing the controlling valve in operative position to discharge fluid from its measuring chamber, the valve parts being shown in elevation for simplification of illustration; Fig. 5 is an enlarged perspective view of the adjustable valve nut forming the inner portion of the valve plug structure; Fig. 6 is an enlarged perspective view of the adjustable abutment screw which serves as an abutment for limiting the axial movement of the valve stem; Fig. 7 is an enlarged perspective view of the valve plug including the thumb-push head; and Fig. 8 is an enlarged perspective view of the valve actuating spring.

In said figures, the valved cap 1 is provided with the internally disposed screw-threads 2 which are arranged to cooperatively engage similar external screw-threads on the neck 3 of the fluid container, preferably in the form of the bottle 5 shown in Fig. 1 with which it is engaged in fluid tight relation by having the interposed annular yielding washer 6, shown in Figs. 3 and 4.

Said valved cap 1 is provided with the transverse bore affording a valve chamber 9 and having regions 10, 11 and 12 of varying diameters and affording annular shoulders 15, 16 and 17. Said bore 7 communicates with the relatively unalined inlet and outlet passageways 19 and 20 respectively directing fluid from the bottle 5 to the valve chamber 9 and from said valve chamber to the outlet 22 in the nozzle or spout 23.

The fluid controlling valve is mounted to reciprocate in the bore 7 and comprises the valve plug 25 having the thumb actuated push-head 26 and the threaded valve stem 27 on which the cap nut 29 is threadedly mounted for axial adjustment, whereby the valve chamber 9 may be readily varied to measure predetermined quantities of fluid being dispensed from the container 5.

The cap nut 29 is provided with the threaded bore 30 extending therethrough and into which the threaded valve stem 27 extends for adjustment by rotating the cap nut 29 by means of a screw driver engaged with the slot 31, while the valve plug is prevented from rotation by means of an instrument such as a bodkin extended through the transverse aperture 32 in the push-head 26.

Said fluid controlling valve is normally maintained in position wherein its measuring chamber 9 registers with the inlet passageway 19, by the spiral spring 35 which encircles the valve plug 25 within the region 11 of the transverse bore 7, and which has its opposite ends bearing against the annular shoulder 16 and the inner end of the push-head 26, as shown in Figs. 2, 3 and 4.

Relative adjustment of the valve plug 25 and its cap nut 29 may be limited by the abutment screw-plug 36 which is threadedly engaged in the threaded bore of said cap nut 29 but which may be adjusted to vary the limited relative axial adjustment of said valve plug 25 and its cap nut 29 by one who may be possessed of the necessary tool that will enter the threaded bore of the cap nut 29 and engage the slot 37 in the outer end of said abutment screw-plug 36.

From the foregoing it will be seen that the valved screw-cap 1 may normally form the closure for the bottle 5 containing fluid such as mercury, which when said bottle is inverted flows into the valve chamber 9 through the inlet passageway 19, and that the charge of mercury thus measured may be discharged by axial movement of the valve plug 25 through the discharge or outlet passageway 20 into a mixing bowl, or other convenient receiver, containing a predetermined amount of alloy that will properly provide the required consistency when combined with the predetermined charge of mercury dispensed.

My invention is advantageous in that the valve structure herein shown and described includes an adjustable abutment which is not readily accessible to others than the authorized operator who may be equipped with the required tool for effecting the desired adjustment, so that he can be reasonably certain of the proper charge of mercury dispensed.

I do not desire to limit my invention to the precise details of construction and arrangement as herein set forth, as it is obvious that various modifications may be made therein without departing from the essential features of my invention as defined in the appended claims.

Having thus described my invention, I claim:

1. A fluid dispensing closure cap providing a fluid-tight closure for a fluid container and comprising a body provided with a fluid ejecting spout and including relatively separated non-alined inlet and outlet passageways communicating with a transverse bore extended through said cap, a valve plug arranged to reciprocate in said bore and having a unitary threaded stem, a cap nut having a restricted threaded bore, cooperative with said stem and adjustable thereon to provide a fluid measuring chamber of varying dimensions arranged to alternately register with the inlet and outlet passageways, and an abutment plug arranged to limit relatively opposed movements of said valve plug and cap nut, being disposed wholly within said bore remote from the ends thereof and in engagement with the threads therein.

2. A fluid dispensing valve comprising a body having a valve plug receiving bore in communication with relatively non-alined inlet and outlet passageways, a valve plug mounted to reciprocate in said bore and comprising a threaded stem, a cap nut, having a threaded bore, adjustable on said stem and affording a fluid measuring chamber of variable extent, and alternately registrable with said inlet and outlet passageways, and an abutment plug wholly disposed in said threaded bore, arranged to determine the extent of adjustment of said cap nut on said stem, but being incapable of axial adjustment except by a suitably provided tool extended through said threaded bore.

3. A device of the class described comprising a body having a transverse bore in communication with relatively non-alined inlet and outlet passageways, a valve arranged to control the passage of fluid therethrough comprising a valve plug having a screw-threaded stem an adjustable cap nut having a restricted threaded bore threadedly mounted on said stem and cooperative therewith to afford a fluid measuring chamber, yielding means arranged to normally maintain said valve plug in position to register said chamber with said inlet passageway, and an abutment plug threadedly engaged in said bore in a position remote from its open end and serving as a stop for limiting the relatively approaching adjustment of said valve plug and cap nut.

ROBERT C. ANGELL.